United States Patent [19]

Cogswell et al.

[11] 4,417,043
[45] Nov. 22, 1983

[54] ANISOTROPIC MELT-FORMING POLYMER

[75] Inventors: Frederic N. Cogswell, Welwyn Garden City; Brian P. Griffin, St. Albans; Clive P. Smith, Wheathampstead, all of England

[73] Assignee: Imperial Chemical Industries PLC, London, England

[21] Appl. No.: 222,685

[22] Filed: Jan. 5, 1981

[30] Foreign Application Priority Data

Jan. 24, 1980 [GB] United Kingdom ............... 8002476

[51] Int. Cl.³ .................. C08G 63/18; C08G 63/68; C08G 69/44
[52] U.S. Cl. ............................. 528/176; 528/173; 528/190; 526/261; 528/191; 528/193; 526/274; 528/194; 528/271; 526/278; 528/272; 528/291; 526/317; 528/292; 528/302; 526/318; 528/304; 528/305; 526/320; 528/308; 528/339; 526/321; 528/342; 528/348; 526/322; 528/350; 528/353; 526/323; 526/323.1; 526/323.2; 526/324; 526/325; 526/327; 526/328; 526/329; 526/330; 526/331; 526/335; 526/336; 526/337; 526/338; 526/339; 526/340; 528/59; 528/60; 528/65; 528/80; 528/81; 528/84; 528/85; 528/172

[58] Field of Search ............... 528/191, 193, 194, 190, 528/172, 173, 176, 59, 60, 65, 80, 81, 84, 85, 271, 272, 291, 292, 302, 304, 305, 308, 309, 339, 342, 348, 350, 353; 526/261, 274, 278, 317–323.2, 324, 325, 327–331, 335–340

[56] References Cited

U.S. PATENT DOCUMENTS

| | | | |
|---|---|---|---|
| 3,991,014 | 11/1976 | Kleinschuster | 528/190 |
| 4,118,372 | 10/1978 | Schaefgen | 528/193 |
| 4,153,779 | 5/1979 | Jackson, Jr. et al. | 528/190 |
| 4,294,953 | 10/1981 | Quinn et al. | 528/190 |

*Primary Examiner*—Lester L. Lee
*Attorney, Agent, or Firm*—Cushman, Darby & Cushman

[57] ABSTRACT

A polymer capable of forming an anisotropic melt characterized in that the polymer chain includes residues of cross-linking reactants at a concentration sufficient to give a polymer with a melt viscosity of not greater than $10^7$ Nsec/m² measured by capillary rheometry at a shear rate of $10^4$ N/m². The polymers exhibit favorable shear dependent viscosity characteristics in that the viscosity is high under low shear conditions and is low under high shear conditions, as judged by the viscosity characteristics of polymers of the same composition but not containing the residues of cross-linking reactants.

10 Claims, No Drawings

ANISOTROPIC MELT-FORMING POLYMER

This invention relates to polymers which are capable of exhibiting anisotropic melt behaviour.

There has been considerable interest recently in polymers which are capable of forming an anisotropic melt. The interest in these polymers stems from the ordering of the polymer molecules into domains of polymer chains in melts of the polymer. As a consequence of the ordering the melts have a relatively low viscosity and products obtained from the melt have a high degree of orientation leading to enhanced physical properties in the product, such as strength and stiffness. Typical of these polymers are aromatic polyesters which are capable of forming anisotropic melts as dessribed in British Pat. No. 1,507,207. The preparation of such polyesters having a high molecular weight can be difficult without resorting to unduly long reaction times in the autoclave or a post-polymerisation treatment in which the polymer is polymerised in the solid phase below the melting point of the polymer. It has now been found possible to overcome such difficulties and to produce modified polymers which retain their ability to exhibit melt anisotropy whilst having other advantageous characteristics.

According to the invention there is provided a polymer which is capable of forming an anisotropic melt characterised in that the polymer chain includes residues derived from cross-linking reactants, the residues being present at a concentration which is insufficient to give a fully cross-linked polymer as defined by having a melt viscosity of less than $10^7$ Nsec/m$^2$ when measured using capillary rheometry at a temperature below the decomposition point of the polymer and at a shear stress of $10^4$ N/m$^2$.

The products of the invention are not only produced more economically than the similar products of equivalent intrinsic viscosity but not containing the cross-linking moieties, but also have improved physical properties and desirable melt viscosity characteristics in respect of their behaviour to varying degrees of shear. In polymer processing operations such as fibre spinning and injection moulding it is desirable to have a low viscosity to achieve large deformations easily. However, in some processes, especially those involving the controlled stretching of free surfaces (film blowing, foaming, blow moulding) it is desirable to have a high viscosity to resist uncontrolled deformation under gravity. In such processes the stresses due to gravity are low (typically of the order $10^2$ to $10^4$ N/m$^2$). Many such processes also require a shaping stage at high stress (about $10^5$ N/m$^2$) where it is desirable to have a low viscosity. Thus during film blowing or blow moulding, a low viscosity is to be preferred under the high shear stress conditions in the die while a high viscosity at low shear stress is desired to prevent the extrudate deforming under its own weight. In injection moulding of structural foam it is desired that the melt should have a low viscosity under high shear stress to allow it to be carried into the mould but a high viscosity under low shear stress to prevent premature collapse and running together of the bubbles. The polymers of the invention have these desirable shear-dependent characteristics and, surprisingly, show a greater shear dependency than similar polymers of the same intrinsic viscosity but which do not contain the residues of cross-linking reactant.

Accordingly there is also provided a polymer which is capable of forming an anisotropic melt and contains residues of cross-linking reactants as hereinbefore defined characterised in that the viscosity of the polymer melt is shear dependent and is low under conditions of high shear and is high under conditions of low shear, relative to a polymer of the same composition not containing the cross-linking residues.

The current theories on the requirements for the formation of ordered melts (see, for example, the paper entitled Liquid Crystal Polymers, II Preparation and Properties of Polyesters Exhibiting Liquid Crystalline Melts by Macfarlane, Nicely and Davis presented at the 8th Biennial Polymer Symposium in November 1976 at Key Biscayne) emphasize the importance of maintaining substantial linearity of the polymer chain in order to achieve anisotropic melt behaviour. In the case of the polyesters of British Pat. No. 1,507,207 it is indicated that it is important, in order to obtain the anisotropic melts, to have the stiffness of a chain comprising predominantly of aromatic or cycloaliphatic rings, while reducing in a controlled way the melting point to within a desirable range. The specification discloses that this desideratum can be achieved by the limited substitution of the ring structures, limited copolymerisation (using more than one species of dihydric phenol or dicarboxylic acid) or by introducing limited flexibility in the rings. In practice it is found that there is very little latitude in these limited modifications without incurring the penalties of increased viscosity and reduced stiffness in the solid state through disruption of the nematic phase. It is therefore, surprising to find that the introduction of residues of cross-linking reactants give a product having an increased melt viscosity together with an increased stiffness and toughness in the solid state.

The polymers which may be adapted according to the invention by the introduction of residues of cross-linking agents are any of the polymers which are capable of forming anisotropic melts. These include polymers formed by a variety of processes, for example, in conventional addition of condensation polymerisation processes.

Typical of anisotropic melt-forming polymers are those polyesters described in No. 1 507 207 and U.S. Pat. No. 3,778,410. Polyazomethines which are capable of forming an anisotropic melt are described in U.S. Pat. No. 4,048,148. Polyesteramides which are capable of forming anisotropic melts are disclosed in European patent application No. 79 391 276. Polyisocyanates capable of forming anisotropic melts are described in the Journal of the American Chemical Society, Volume 12, No. 3, May-June 1979, pages 537 to 538.

Polyesters having pendant mesogenic vinyl groups are described in German patent application 27 22 589.

The cross-linking reactant used to form the residue in the anisotropic melt-forming polymer will depend on the type of polymerisation process involved. For the condensation polymers such as polyesters and polyesteramides which use difunctional reactants the cross-linking reactant should be at least tri-functional. Typical of such multi-functional reactants are materials containing at least three reactive hydroxyl, carboxyl, amino, isocyanate or carbodiimide groups which may be the same or different within the same molecule. The multi-functional reactants may be polymeric in nature providing that they contain at least three available reaction sites. In the case of products prepared by polymerisation processes which proceed by addition polymerisation of mono-ethylenically unsaturated materials the cross-linking reactant will be a material containing at least two ethylenically unsaturated groups capable of entering into the polymerisation reaction. Such cross-linking reactants include di- and trivinylbenzene, polyacrylic and polymethacrylic esters of polyols such as butylene glycol diacrylate and dimethacrylate, trimethylolpropane, trimethacrylate, vinyl acrylate and methacrylate, allyl; methylallyl and crotyl estes of acrylic acid, methacrylic acid, maleic acid (and its mono- and di-esters), fumaric acid (and its mono-and di-esters) and itaconic acid (and its mono- and di-esters); triallyl cyanurate and triallyl phosphate.

The maximum concentration of cross-linking residue in the polymer will be determined by the level of such residue which may be present without resulting in a polymer chain network which is completely cross-linked. The efficiency of cross-linking reactants, by which is meant the concentration required to produce an insoluble network, will vary widely between different cross-linking reactants. The concentration of cross-linking residues present in the polymer of the invention will therefore also vary widely. The maximum concentration possible without completely cross-linking the polymer will normally be less than 1% by weight of the total polymer but for a very inefficient cross-linking agent or when a low molecular weight polymer is used as much as 5% or more of cross-linking reactant may be used.

Useful improvements in the behaviour of the polymers of the invention over the same polymers not containing the cross-linking residue can be observed using 0.01% by weight or even less of cross-linking residues. The most useful range of concentrations are between 0.01 and 1% and preferably between 0.1 and 0.5% by weight of the polymer.

The present invention also includes the processes of preparing polymers capable of forming anisotropic melts containing residues of cross-linking reactants.

Accordingly there is also provided a method of producing an aniostropic melt-forming polymer which has a shear dependent viscosity in the melt characterised in that the anisotropic melt-forming polymer is polymerised in the presence of cross-linking reactants at a concentration sufficient to give a polymer with a melt viscosity in excess of that for the same polymer not containing cross-linking agent but insufficient to exceed a melt viscosity of $10^7$ Nsec/m$^2$ when measured using capillary rheometry at a temperature below the decomposition point of the polymer and at a shear stress of $10^4$ N/m$^2$.

The polymers of the invention may be used in a variety of fabrication processes such as injection moulding, extruding, blow moulding, film and fibre formation and may also contain the usual auxiliary materials such as stabilisers and fillers known to those skilled in the art.

The invention is further illustrated by reference to the following Examples.

COMPARATIVE EXAMPLE A

A polyester was prepared from chlorhydroquinone diacetate (0.6 mole), ethylenedioxy-4,4'-dibenzoic acid (0.3 mole) and terephthalic acid (0.3 mole) according to the method of Example 3 of U.S. Pat. No. 3,991,013. The polymer (Sample I) was found to have an intrinsic viscosity (measured in a 30:70 w/w mixture of trifluoroacetic acid and dichloroethane) of 0.93. In a repeat preparation a polymer (Sample II) of IV=1.07 was obtained. Table 1 below shows the melt viscosity characteristics and some physical properties of these polymers:

TABLE 1

| Sample | IV | Melt viscosity at 270° C. (Ns/m$^2$) at $10^4$ N/m$^2$ | at $10^5$ N/m$^2$ | Shear sensitivity n at $10^4$ N/m$^2$ n at $10^5$ N/m$^2$ | Falling weight impact strength (J) | Flexural modulus (GN/m$^2$) |
|---|---|---|---|---|---|---|
| I | 0.93 | 38 | 25 | 1.5 | 0.4 | 15 |
| II | 1.07 | 44 | 32 | 1.4 | 0.4 | 15 |

EXAMPLE 1

A polyester was prepared using the same reaction conditions as in Comparative Example A except in that there was also present 0.3% by weight of the total reactants of pyrogallol triacetate. A polymer having an inherent viscosity of 1.00 resulted (measured on 0.5% solution in a mixture of 70:30 w/w trifluoroacetic acid and dichloroethane). In a repeat experiment a polymer of IV=1.10 was obtained. The polymer exhibited an anisotropic melt. Table 2 below lists the melt viscosities obtained using a capillary rheometer fitted with an exit die 1.18 mm in diameter and 8 mm long. The mechanical properties recorded were measured on injection moulded edge-gated plaques (90 mm×90 mm×1.5 mm).

TABLE 2

| Sample | IV | Melt viscosity at 270° C. (Ns/m$^2$) at $10^4$ N/m$^2$ | at $10^5$ N/m$^2$ | Shear sensitivity n at $10^4$ N/m$^2$ n at $10^5$ N/m$^2$ | Falling weight impact strength (J) | Flexural modulus (GN/m$^2$) |
|---|---|---|---|---|---|---|
| A | 1.00 | 2400 | 380 | 6.3 | 0.7 | 20 |
| B | 1.10 | 1700 | 400 | 4.3 | 0.7 | 20 |

The incorporation of the multi-functional groups has led to a fourty-fold increase in viscosity at low stress but the increased shear sensitivity means that these melts are still processable at high shear. Further, rather than any loss in stiffness which might have been expected from the incorporation of multi-functional groups disturbing the orientation and order of the liquid crystal, the polymers containing multi-functional groups are actually stiffer than the control of Comparative Example A.

The shear sensitivity of the polymer persists to high temperatures. Thus at a melt temperature of 330° C. values of 180 and 50 Nsec/m$^2$ at 10$^4$ N/m$^2$ and 10$^5$ N/m$^2$ respectively were obtained.

EXAMPLE 2

Polyesters containing chlorhydroquinone (0.5 mole), 4,4′-oxydibenzoic acid (0.25 mole), terephthalic acid (0.125 mole) and isophthalic acid (0.125 mole) were prepared containing varying quantites of pyrogallol triacetate according to the method used in Example 1. Table 3 below indicates the effect of the cross-linking reactant concentration on the apparent intrinsic viscosity and the melt viscosity of the products:

TABLE 3

| Pyrogallol triacetate concentration (% by weight of total reactants) | Apparent IV | Melt viscosity at 285° C. and 10$^4$ N/m$^2$ | Nature of melt |
|---|---|---|---|
| 0 | 1.16 | 6000 | Anisotropic |
| 0.1 | 1.8 | 25000 | Anisotropic |
| 1.0 | did not dissolve in solvent* | 10$^6$ | Unacceptably stiff at 320° C. |

*30:70 w/w trifluoroacetic acid/dichloromethane.

We claim:

1. A polymer which is capable of forming an anisotropic melt characterised in that the polymer has been prepared in the presence of cross-linking reactants whereby the polymer chain includes residues derived from said cross-linking reactants, the residues being present at a concentration which is insufficient to give a fully cross-linked polymer as defined by having a melt viscosity of less than 10$^7$ Nsec/m$^2$ when measured using capillary rheometry at a temperature below the decomposition point of the polymer and at a shear stress of 10$^4$ N/m$^2$.

2. A polymer which is capable of forming an anisotropic melt according to claim 1 characterised in that the viscosity of the polymer melt is shear dependent and is low under conditions of high shear and is high under conditions of low shear, relative to a polymer of the same composition not containing the cross-linking residues.

3. A polymer according to either of claims 1 or 2 characterised in that the polymer is a condensation polymer and the residues of cross-linking reactants are derived from reactants containing at least three reactive functional groups.

4. A polymer according to claim 3 in which the reactive functional groups are selected from hydroxyl, carboxyl, amino, isocyanate and carbodiimide groups.

5. A polymer according to either of claims 1 or 2 characterised in that the polymer is an addition polymer of mono-ethylenically unsaturated materials and the residues of cross-linking reactants are derived from polyethylenically unsaturated compounds containing at least two ethylenically unsaturated groups.

6. A polymer according to claim 1 characterised in that the concentration of cross-linking residues in the polymer is between 0.01 and 5% by weight of the polymer.

7. A polymer according to claim 1 characterised in that the concentration of cross-linking residues in the polymer is between 0.01 and 1% by weight of the polymer.

8. A method of producing an anisotropic melt-forming polymer which has a shear dependent viscosity in the melt characterised in that the anisotropic melt-forming polymer is polymerised in the presence of cross-linking reactants at a concentration sufficient to give a polymer with a melt viscosity in excess of that for the same polymer not containing cross-linking agent but insufficient to exceed a melt viscosity of 10$^7$ Nsec/m$^2$ when measured using capillary rheometry at a temperature below the decomposition point of the polymer and at a shear stress of 10$^4$ N/m$^2$.

9. An anisotropic melt of a polymer according to claim 1.

10. A shaped article formed from the anisotropic melt of claim 9.

* * * * *